US010540130B2

(12) United States Patent
Yoshida

(10) Patent No.: US 10,540,130 B2
(45) Date of Patent: Jan. 21, 2020

(54) MANAGEMENT APPARATUS FOR DESIGNATING ONE OR MORE IMAGE FORMING APPARATUSES AS PREFERENTIAL IMAGE FORMING APPARATUSES FOR REQUESTING JOB INFORMATION FROM A SERVER

(71) Applicant: Konica Minolta, Inc., Chiyoda-ku, Tokyo (JP)

(72) Inventor: Okihisa Yoshida, Kawanishi (JP)

(73) Assignee: KONICA MINOLTA, INC., Chiyoda-Ku, Tokyo ( * ) Notice: Subject to any disclaimer, the term of this patent is extended or adjusted under 35 U.S.C. 154(b) by 0 days.

(21) Appl. No.: 14/728,213

(22) Filed: Jun. 2, 2015

(65) Prior Publication Data
US 2015/0347881 A1 Dec. 3, 2015

(30) Foreign Application Priority Data

Jun. 3, 2014 (JP) ................. 2014-114821

(51) Int. Cl.
*G06F 3/12* (2006.01)
*H04N 1/00* (2006.01)

(52) U.S. Cl.
CPC .......... *G06F 3/1271* (2013.01); *G06F 3/1267* (2013.01); *G06F 3/1291* (2013.01); *H04N 1/0023* (2013.01)

(58) Field of Classification Search
CPC .... G06F 3/1239; G06F 3/1294; G06F 3/1267; Y02B 60/1271; H04N 1/0023
See application file for complete search history.

(56) References Cited

U.S. PATENT DOCUMENTS

| 6,778,289 B1* | 8/2004 | Iwata ................ G06F 17/30864 358/1.1 |
| 2007/0281623 A1* | 12/2007 | Liu ....................... H04W 24/08 455/67.11 |
| 2008/0158597 A1 | 7/2008 | Hashimoto et al. |
| 2009/0013065 A1 | 1/2009 | Nagashima |

(Continued)

FOREIGN PATENT DOCUMENTS

| CN | 102196139 A | 9/2011 |
| JP | 2005-223551 A | 8/2005 |

(Continued)

OTHER PUBLICATIONS

Notification of First Chinese Office Action issued by the State Intellectual Property Office of the People's Republic of China dated Aug. 28, 2017 in corresponding Chinese Patent Application No. 201510293953.6, and English Translation. 16 pages.

*Primary Examiner* — Peter K Huntsinger
(74) *Attorney, Agent, or Firm* — Buchanan Ingersoll & Rooney PC

(57) ABSTRACT

A management apparatus included in a system including a plurality of MFPs receives a use history of a user from at least one MFP among the plurality of MFPs. The management apparatus, based on the use history, designates a group including one or more MFPs among the plurality of MFPs as MFPs being preferentially requested information related to a job issued by the user. Then, the management apparatus updates a group, which is stored in the storage device and previously designated, to be a designated group.

26 Claims, 8 Drawing Sheets

(56) References Cited

U.S. PATENT DOCUMENTS

| | | | |
|---|---|---|---|
| 2011/0299120 A1* | 12/2011 | Sekine | G06F 3/1221 |
| | | | 358/1.15 |
| 2012/0320412 A1* | 12/2012 | Yoshimura | G06F 3/1204 |
| | | | 358/1.15 |
| 2013/0057906 A1* | 3/2013 | Hosoda | G06F 3/1292 |
| | | | 358/1.15 |
| 2014/0063546 A1* | 3/2014 | Nakayama | G06F 3/1273 |
| | | | 358/1.15 |

FOREIGN PATENT DOCUMENTS

| | | |
|---|---|---|
| JP | 2008-146437 A | 6/2008 |
| JP | 2009-015520 A | 1/2009 |

* cited by examiner

FIG.5

|      | NUMBER OF ACCESS | FAVORITE | LAST ACCESS TIME |
|------|------------------|----------|-------------------|
| MFP1 | 3 | ✔ | 2014/03/24 12:45' 32" |
| MFP2 | 0 |   |   |
| MFP3 | 0 |   |   |
| MFP4 | 6 | ✔ | 2014/03/23 19:32' 56" |
| MFP5 | 8 | ✔ | 2014/03/20 08:40' 05" |
| MFP6 | 2 |   | 2013/12/02 10:18' 29" |
| MFP7 | 0 |   |   |

MANAGEMENT APPARATUS FOR DESIGNATING ONE OR MORE IMAGE FORMING APPARATUSES AS PREFERENTIAL IMAGE FORMING APPARATUSES FOR REQUESTING JOB INFORMATION FROM A SERVER

This application is based on Japanese Patent Application No. 2014-114821 filed with the Japan Patent Office on Jun. 3, 2014, the entire content of which is hereby incorporated by reference.

BACKGROUND OF THE INVENTION

Field of the Invention

The present disclosure relates to a management apparatus and an image forming apparatus, particularly to a management apparatus used in an image forming system constituted of a plurality of image forming apparatuses and to an image forming apparatus provided with the management apparatus.

Description of the Related Art

There has been proposed a system including a plurality of image forming apparatuses such as MFPs (Multi-Functional Peripherals) connected to a network and being capable of printing in a ubiquitous manner. This system is also referred to as a ubiquitous printing system. For example, Japanese Laid-Open Patent Publication No. 2009-015520, Japanese Laid-Open Patent Publication No. 2008-146437, and Japanese Laid-Open Patent Publication No. 2005-223551 disclose various arts related to a printing system including a plurality of printers.

Further, since image forming apparatuses tend to have a server function along with the improvement in functions of image forming apparatus, the system tends to have no server. Such a system is also referred to as a serverless ubiquitous printing system.

In a serverless ubiquitous printing system, any of image forming apparatuses exhibits a server function and serves as a server. With respect to an image forming apparatus logged in by a user, the apparatus serving as a server gives a list of jobs issued by the user. Accordingly, the user can confirm at the image forming apparatus, to which he has logged in, jobs issued by himself and spooled to the image forming apparatus serving as a server and then give an instruction to print.

Such a system is often constructed, for example, in an office environment. Therefore, there is an increasing need to include a large number of image forming apparatuses in the system along with an extension of an office.

However, as the number of image forming apparatuses constituting the system increases, the number of image forming apparatuses enquired from an image forming apparatus logged in by a user a presence of spooling of jobs issued by the user increases. It causes an increased load on a communication within the system. Consequently, a throughput in the system is lowered disadvantageously.

SUMMARY OF THE INVENTION

An object according to one aspect of the present disclosure is to provide a management apparatus capable of preventing the lowering of a throughput in an image forming system even when the number of image forming apparatuses included in the image forming system increases. Moreover, an object according to one aspect of the present disclosure is to provide an image forming apparatus capable of preventing the lowering of a throughput in an image forming system even when the number of image forming apparatuses included in the image forming system increases.

In accordance with one embodiment, a management apparatus is a management apparatus used in an image forming system having a plurality of image forming apparatuses connected. This management apparatus includes a control unit (processor), in order to request information related to a job issued by a user, that designates one or more image forming apparatuses among a plurality of image forming apparatus as a group of image forming apparatuses having a higher priority of requesting information related to the job in association with the user and store the group to a storage device, and a receiving unit (receiver) that receives a use history of a user from the plurality of image forming apparatuses. The control unit designates image forming apparatuses having a higher priority of requesting information related to the job associated with the user based on the use history of the user received by the receiving unit and updates the group stored in the storage device.

The foregoing and other objects, features, aspects and advantages of the present disclosure will become more apparent from the following detailed description of the present invention when taken in conjunction with the accompanying drawings.

BRIEF DESCRIPTION OF THE DRAWINGS

FIG. 5 represents a specific example of a user's favorite group.

DESCRIPTION OF THE PREFERRED EMBODIMENT

Figure 1:
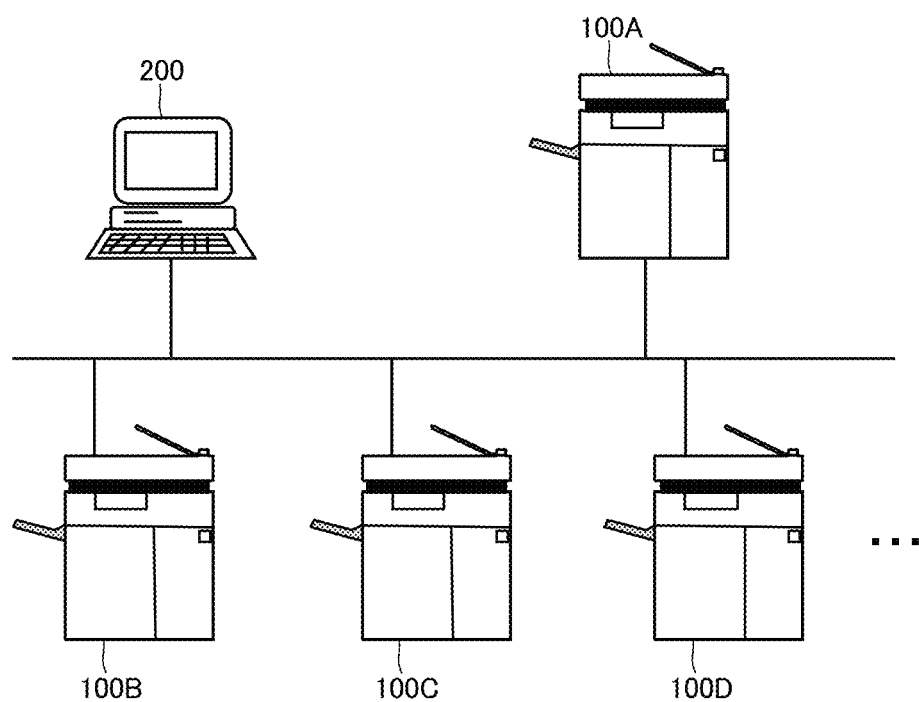
FIG. 1 represents a specific example of a configuration of a printing system (hereinafter, referred to as a system) according to an embodiment.

Hereinafter, an embodiment of the present invention will be described with reference to the drawings. In the following description, the same parts and components have the same reference numerals allotted. Names and functions of those are also the same. Thus, description thereof will not be repeated.

FIG. 1 represents a specific example of a configuration of a printing system (hereinafter, referred to as a system) according to the present embodiment. Referring to FIG. 1, the present system includes a plurality of MFPs (Multi-Functional Peripherals) 100A, 100B, 100C, and so on (these are also referred to as MFP 100 collectively) as one example of image forming apparatuses.

MFP 100 can receive a job from other device such as a PC (Personal Computer) 200 electrically connected to MFP 100. MFP 100 stores (spools) a received job into a memory.

Figure 2:
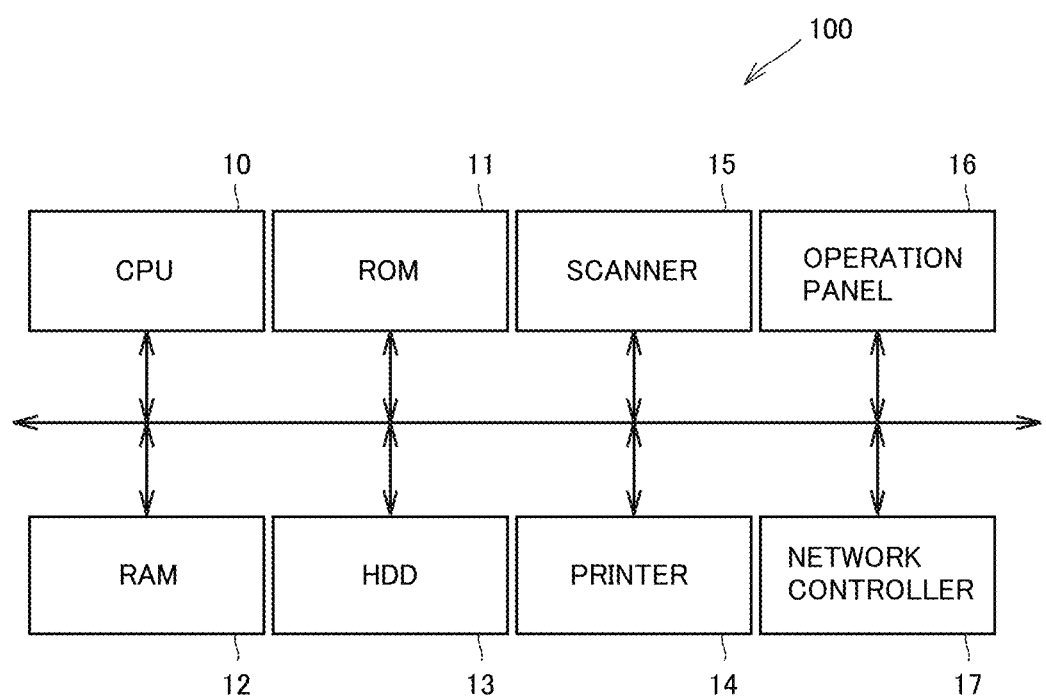
FIG. 2 is a block diagram representing a specific example of a device configuration of an MFP (Multi-Functional Peripheral) included in the system.

FIG. 2 is a block diagram representing a specific example of a device configuration of MFP 100. Referring to FIG. 2, MFP 100 includes a CPU (Central Processing Unit) 10 for controlling an entire apparatus, an ROM (Read Only Memory) as a memory for storing a program executed on the CPU, an RAM (Random Access Memory) 12 which is a memory serving as a working area during the execution of the program on CPU 10, an HDD (Hard Disk Drive) as one example of a large storage device for storing a job and the like, a printer 14, a scanner 15, an operation panel 16, and a network controller 17 for communication with other MFPs and PCs.

Figure 3:
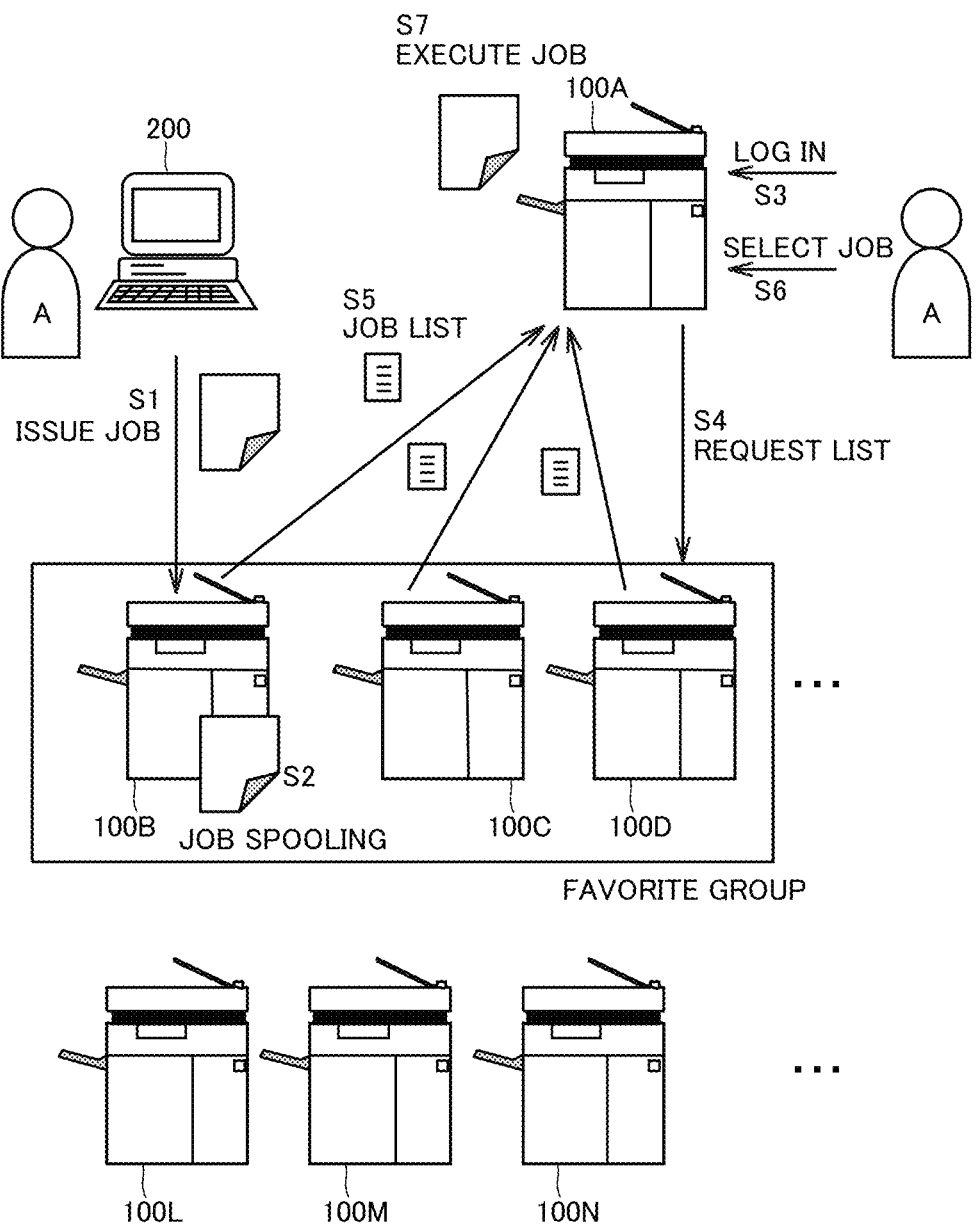
FIG. 3 is a drawing for explanation of an overview of operation in the system.

FIG. 3 is a diagram for explanation of an overview of operation in the present system. Referring to FIG. 3, a user A of PC 200 issues a job to the present system from PC 200 (Step S1). The job issued by user A is transmitted to an MFP (MIP 100B in FIG. 3) defined in advance for user A among a plurality of MFPs constituting the present system. Then, the job is spooled to MFP 100B (Step S2). The MFP spooling the job will be also referred to as a storage MFP in the following description.

The MFP defined as the storage MFP of user A is stored and managed by a port monitor installed in PC 200. In other words, when a transmission of a job of user A is instructed from a job creating program such as a document creating application, the port monitor of PC 200 transmits the job to the MFP stored in advance for user A as the storage MFP regardless of an instruction as to a destination from the program.

When the issued job is to be processed (for example, printed) in the present system, user A may log in to any MFP. For example, when the issued job is to be processed, user A logs in to MFP 100A included in the present system (Step S3). It should be noted that the MFP logged in by the user will be also referred to as a client MFP in the following description.

MFP 100A as a client MFP requests each MFP 100 included in the present system a list of information (hereinafter, referred to as a list) specifying the job issued by user A (Step S4). The MFP having received this request transmits the list to MFP 100A when the job issued by user A is spooled (Step S5).

MFP 100A displays a list of jobs issued by user A with respect to the present system based on the inputted list and on the job issued by user A and spooled in MIP 100. Then, MFP 100A receives a selection of a job to be executed from the list (Step S6). When the job to be executed is selected, MFP 100A requests the job to the storage MFP spooling the job. Then, MFP 100A having received the job executes the processing of the job (Step S7).

Here, when the number of MFPs included in the present system is small, a load on communication does not become significantly high even if the client MFP requests a list to all of MFPs included in the present system. However, when the number of MFPs included in the present system is large, the traffic for requesting a list becomes greater and causes a high load. Therefore, the client MFP takes much time to obtain the list and display the same, and it may affect other communication.

Moreover, there is a possibility that the number of lists becomes larger as the number of MFPs included in the present system becomes larger. In such a case, the client MFP displays a large number of jobs as jobs issued by the user. Accordingly, there is a case where it becomes difficult for a user to select from the list a job to be processed.

Therefore, in the present system, the client MFP stores for each user a group constituted of one or more MFPs having a higher priority of requesting a list as a "favorite group." Then, in the above-described Step S4, the client MFP preferentially requests a list to MFPs included in the group. It should be noted that, preferably, the client MFP requests a list to an MFP which is other than MFPs included in the group when the list is not obtained from the group or when the user did not select from the list a job to be executed. Alternatively, the client MFP may request in a background process a list to an MFP other than the MFPs included in the group in parallel with the processing of a list from the favorite group.

The favorite group is created and updated based on a use history of each user in any MFP included in the present system. Preferably, the favorite group is created and updated for each user based on the use history of the user in the MFP which is defined as the storage MFP of the user.

Figure 4:
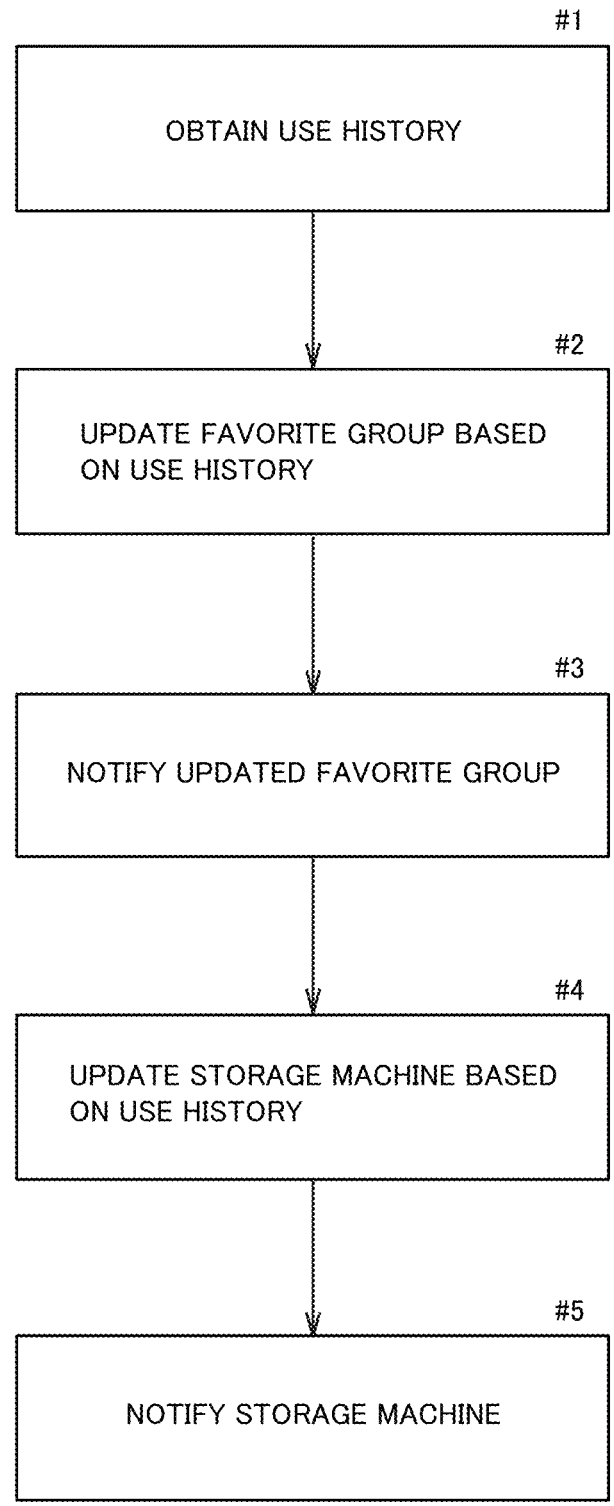
FIG. 4 represents an overview of processing related to a favorite group.

FIG. 4 represents an overview of processing related to the favorite group in the present system. Referring to FIG. 4, the MFP includes a receiving unit and obtains at the receiving unit a use history of a login user from other MFP (Step #1). At a timing when a user has logged out from an MFP or at a timing when a job processing is completed at the MFP, the use history is transmitted from the MFP to other MFP. Moreover, in the MFP, the MFP may obtain a use history by requesting a use history of a predefined user, such as a user whose favorite group is stored, to other MFP at a predefined timing, such as at the time when power is turned on or at predetermined intervals. The use history is accumulated in the MFP having received the same.

Based on a use history of a predefined specified user, preferably based on a use history of a user specifying the MFP as a storage MFP, the MFP updates a favorite group of the user (Step #2). In other words, the MFP designates one or more MFPs belonging to the favorite group of the user. Then, when the designated one or more MFPs are different from the one or more MFPs included in the stored favorite group, the stored favorite group of the user is updated based on the designation described above.

FIG. 5 represents a specific example of a favorite group of a user stored in a memory of the MFP. As one example, the MFP stores for each MFP included in the system the number of access to the MFP as a use history of a user. The number of access represents the number of requesting a list to the MFP, the number of obtaining a job, the number of logging in, and the like. As one example, the MFP designates an MFP having the number of access greater than or equal to a threshold value as an MFP belonging to the favorite group of the user. In the case of the example of FIG. 5, the MFP stores a threshold value of 3 and designates an MFP having the number of access greater than or equal to three times as an MFP belonging to the favorite group of the user.

The favorite group may be updated at each time when the MFP receives a user history at the receiving unit, or may be updated at a specific timing such as at the time when power is turned on or at predetermined intervals. Moreover, as another example, the favorite group may be updated when there is any change in MFPs constituting the present system. Accordingly, the favorite group is changed dynamically in accordance with a use of the present system by a user.

In Step #2, the MFP, as one example, designates one or more predefined MFPs as MFPs belonging to the favorite group of the user in the order of MFPs having a higher frequency of use.

The number of MFPs belonging to a favorite group of one user can be set by a specific user such as a manager or can be set by the one user described above. Alternatively, the number of MFPs belonging to the favorite group may be the number which does not cause a communication speed of the client MFP obtaining a list from the MFPs belonging to the favorite group to be below a predefined speed. Alternatively, when the MFPs belonging to the favorite group are designated by a change in the number of MFPs included in the present system, the number of MFPs belonging to the favorite group may be the number of MFPs in an original state of the present system. In this case, even when the number of MFPs of the present system increases, the client MFP requests a list within the original number.

Alternatively, as another example, the MFP may designate MFPs having a use frequency of one user higher than a threshold value as MFPs belonging to the favorite group of the user. The threshold value can be set by a specific user such as a manager or can be set by the user.

Preferably, when designating MFPs belonging to the favorite group, the MFP uses, as a use history for a predefined user, a history of an MFP having transmitted a list of jobs issued by the user (a list obtaining history), and/or a history of an MFP having transmitted a job selected as a job to be processed by a user (a job obtaining history), and/or a history of becoming a client MFP of the user (a log-in history). In other words, when designating MFPs belonging to the favorite group, the MFP may choose not to use a use history of copying or scanning at the MFP logged in by the user as a use history. Alternatively, when designating MFPs belonging to the favorite group, the MFP may further use a use history of copying or scanning at the MFP logged in by the user as a use history.

Further, preferably, when designating MFPs belonging to a favorite group of one user, the MFP uses the latest use history for the user. In other words, preferably, the MFP uses a use history within a predetermined period among use histories of the user. The predetermined period corresponds to, for example, a period from a current time point to a predefined time point in the past.

In the case of the example in FIG. 5, the last timing of access by a user to each MFP is also stored as a use history. Then, among those, the MFP may designate MFPs belonging to the favorite group with use of only the use history for an access within a predetermined period from a current time point.

In the present system, a favorite group, in other words, a group of one or more MFPs to which a list is preferentially requested is configured based on a use history of a user, so that the client MFP can request a list to an MFP having a higher possibility of being a storage MFP for the user and spooling a job of the user. In other words, the number of MFPs to which the client MFP requests a list can be narrowed down. Therefore, even when the number of MFPs included in the present system increases, the client MFP can obtain a list efficiently while suppressing a load on a communication. Moreover, even when the number of MFPs included in the present system increases, the client MIP does not excessively present jobs based on the list. Therefore, a complexity in an operation for selecting a job to be processed by a user can be suppressed.

When a favorite group of a user is updated, the MFP notifies the updated favorite group to other MFP (Step #3). The MFP includes a first transmitting unit. In Step #3, the MFP uses the above-described first transmitting unit to transmit, for example, information which may specify the MFP as information related respectively to one or more MFPs included in the favorite group of the user to each MFP included in the updated favorite group. At this time, the MFP may notify also to an MFP, which belonged to the favorite group before update but excluded from the favorite group after the update, that the MFP has been excluded from the favorite group. The MFP excluded from the favorite group receives this notification, so that the stored favorite group of the user can be deleted from the memory.

Further, in Step #3, the MFP may transmit also a use history of the user to each MFP included in the updated favorite group. In such a manner, a use history of the user is shared among one or more MFPs included in the updated favorite group.

Preferably, the MFP updates a storage MFP of a user based on a use history of the user being stored in the memory and defining the MFP as the storage MFP (Step #4). The storage MFP may be updated at the same timing as the timing of updating the favorite group, or may be updated at a different timing. Specifically, the storage MFP may be updated when the updating of the favorite group is performed for the predetermined number of times. Accordingly, the storage MFP defined with respect to the user is dynamically changed in accordance with a use of the present system by the user.

In Step #4, the MFP, as one example, designates one or more MFPs having a use frequency higher than a threshold value as a new storage MFP of the user. The use frequency may be the use frequency of use at the time of updating the favorite group. Preferably, the MFP uses the latest use history of the user when designating the storage MFP.

The threshold value herein may be the same as or different from the threshold value used at the time of updating the favorite group in Step #2. When the threshold value herein is different, the threshold value can be set by a specific user such as a manager or can be set by a user to which the storage MFP is defined. Further, the threshold value may be automatically designated in accordance with a condition of spooling a job at each MFP included in the present system. In other words, the MFP may store in advance, as a relationship between a bias (deviation) of the amount of spooling a job at each MFP and a threshold value, a relational expression causing the threshold value to be lower as the deviation be larger and causing the threshold value to be higher as the deviation be smaller. Then, the MFP may obtain the amount of spooling from each MFP and substitute the deviation to the relational expression to calculate the threshold value.

When the storage MFP of the user is updated, the MFP notifies the update to PC 200 (Step #5). The MFP includes a second transmitting unit. In step #5, the MFP transmits, for example, information which may specify the MFP as information related to each of one or more MFPs designated as the storage MFP of the user to PC 200 as a device for issuing a job of the user.

When PC 200 receives this notification, it rewrites the storage at the provided port monitor. Accordingly, when the issuance of a job is received from the user after the notification, PC 200 transmits a job to any of MFPs among one or more MFPs automatically designated by the port monitor as the storage MFP. Moreover, the MFP notifies to each of one or more MFPs newly designated as storage MFPs that the MFPs were designated as storage MFPs and transmits a use history of the user. Accordingly, the one or more new storage MFPs can respectively update the subsequent favorite group of the user or update the storage MFP.

In the present system, the storage MFP is designated based on a use history of a user, so that an MFP having a higher possibility of being accessed by a client MFP logged in by the user or an MFP having a higher possibility of becoming a client MFP become the storage MFP. In other words, the storage MFP is included in the favorite group of the user, and the possibility of being subjected to the request of a list from the client MFP becomes higher. Accordingly, even when the number of MFPs included in the present system increases, the client MFP can obtain a list efficiently while suppressing a load on a communication. Moreover, even when the number of MFPs included in the present system increases, the client MFP does not excessively present a job based on the list. Therefore, a complexity in operation for selecting a job to be processed by a user can be suppressed.

Figure 6:
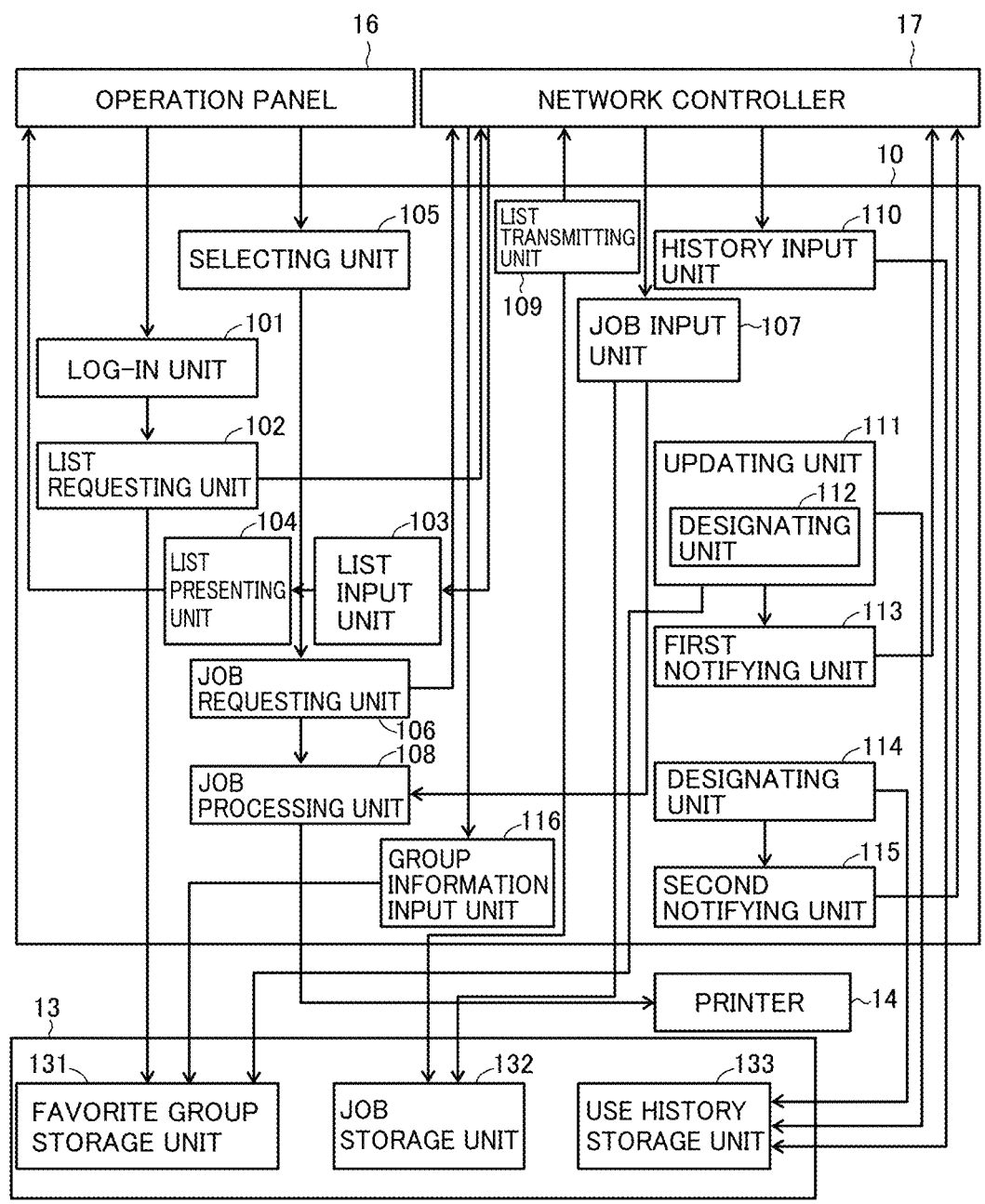
FIG. 6 is a block diagram representing a specific example of a functional configuration of the MFP.

FIG. 6 is a block diagram representing a specific example of a functional configuration of MFP 100 for performing the operation described above. CPU 10 of MFP 100 reads a program stored in a ROM 11 onto a RAM 12 and executes the same, so that each function in FIG. 6 is achieved mainly by CPU 10. However, some functions may be achieved by other configuration presented in FIG. 2 or by other hardware configuration such as an electrical circuit not illustrated in the drawing.

Referring to FIG. 6, an HDD 13 as one example of a memory includes a favorite group storage unit 131 which is a storage region for storing a favorite group for each user, a job storage unit 132 which is a storage region for storing (spooling) a job, and a use history storage unit 133 which is a storage region for storing a use history for each user.

Further referring to FIG. 6, CPU 10 includes a log-in unit 101, a list requesting unit 102, a list input unit 103, a list presenting unit 104, a selecting unit 105, a job requesting unit 106, a job input unit 107, a job processing unit 108, a list transmitting unit 109, a history input unit 110, an updating unit 111, a first notifying unit 113, a designating unit 114, a second notifying unit 115, and a group information input unit 116.

Log-in unit 101 receives a log-in operation from a user using an operation panel or the like and performs a log-in processing.

List requesting unit 102 requests a list of jobs issued by a login user with respect to the present system to other MFP through a network controller 17. List requesting unit 102 refers to a favorite group of a login user stored in favorite group storage unit 131 and requests a list to MFPs belonging to the group more preferentially than MFPs not belonging to the group.

List transmitting unit 109 transmits a list of jobs issued by a specified user to other MFP through network controller 17 in accordance with a request from other MFP.

List input unit 103 receives an input of a list from other MFP through network controller 17. List presenting unit 104 performs a processing of displaying a list of jobs on operation panel 16 based on the list. Selecting unit 105 receives a selection of a job to be executed from the list of jobs. Job requesting unit 106 requests an MFP spooling the selected job to transmit the job through network controller 17.

Job input unit 107 receives from other MFP or PC 200 an input of a job through network controller 17. When the input of the job is received from PC 200, job input unit 107 stores the inputted job into job storage unit 132. When the input of the job is received from other MFP, job input unit 107 gives the inputted job to job processing unit 108.

Job processing unit performs the job such as performing printing with a printer 14 in accordance with an instructing operation by a login user.

History input unit 110 is a receiving unit which receives a use history of a user from one or more other MFPs respectively. Then, history input unit 110 stores the inputted use history to use history storage unit 133.

Updating unit 111 updates a favorite group of a user stored in favorite group storage unit 131. Updating unit 111 includes a designating unit 112. At a timing when a use history of a user defining the MFP as a storage MFP is inputted, or at a predefined timing such as at the time when power is turned on, at a predetermined interval, or at a time when the number of MFPs included in the present system is changed, designating unit 112 refers to a use history of the above-described user among use histories stored in use history storage unit 133 and designates MFPs included in a favorite group of the above-described user. Preferably, designating unit 112 refers to the use history of the above-described user until the predefined number has been reached, and designates MFPs included in the favorite group in the order from MFPs having a higher use frequency of the user. Preferably, the predefined number is the number of MFPs whose speed of obtaining a list satisfies a predefined speed.

Alternatively, designating unit 112 designates an MFP having a use frequency of the user higher than a predefined threshold value. Preferably, the threshold value is set by a specific user such as a manager or by the user and stored in advance in designating unit 112.

First notifying unit 113 notifies an updated favorite group to other MFP through network controller 17. In other words, first notifying unit 113 is a first transmitting unit and transmits information related respectively to one or more MFPs belonging to the updated favorite group to one or more MFPs belonging to the group respectively. Group information input unit 116 receives from other MFP a notification of a favorite group of a user.

At a timing when a use history of a user defining the MFP as a storage MFP is inputted, or at a predefined timing such as at the time when power is turned on, at a predetermined interval, or at a time when the number of MFPs included in the present system is changed, designating unit 114 refers to a use history of the above-described user among use histories stored in use history storage unit 133 and designates a new storage MFP of the above-described user.

Preferably, designating unit 114 designates an MFP having a use frequency of the user higher than a predefined threshold value as a new storage MFP of the user. In this case, preferably, the threshold value may be set by a specific user such as a manager or the user and stored in advance in designating unit 114 or may be calculated by designating unit 114 in accordance with a condition of spooling a job at each MFP included in the present system. In other words, designating unit 114 may store in advance a relational expression between a bias (deviation) of the amount of spooling a job at each MFP and a threshold value, obtain the amount of spooling from each MFP, and substitute the deviation into the relational expression to calculate the threshold value. Preferably, the relational expression defines a relationship causing the threshold value to be lower as the deviation be larger and causing the threshold value to be higher as the deviation be smaller.

At this time, the use history to be used may be a use history within a predetermined period among use histories of the user, for example, a use history within a period from a current time point to a time point before a predetermined period. Preferably, the use history to be used includes at least one of a list obtaining history, a job obtaining history, and a history of becoming a client MFP.

Second notifying unit 115 notifies the designated storage MFP to PC 200 and an MFP designated as a storage MFP through network controller 17. In other words, second notifying unit 115 is a second transmitting unit and transmits information related to the MFP designated as the storage MFP of the user to PC 200 as a device which issues a job of the user.

Figure 7:
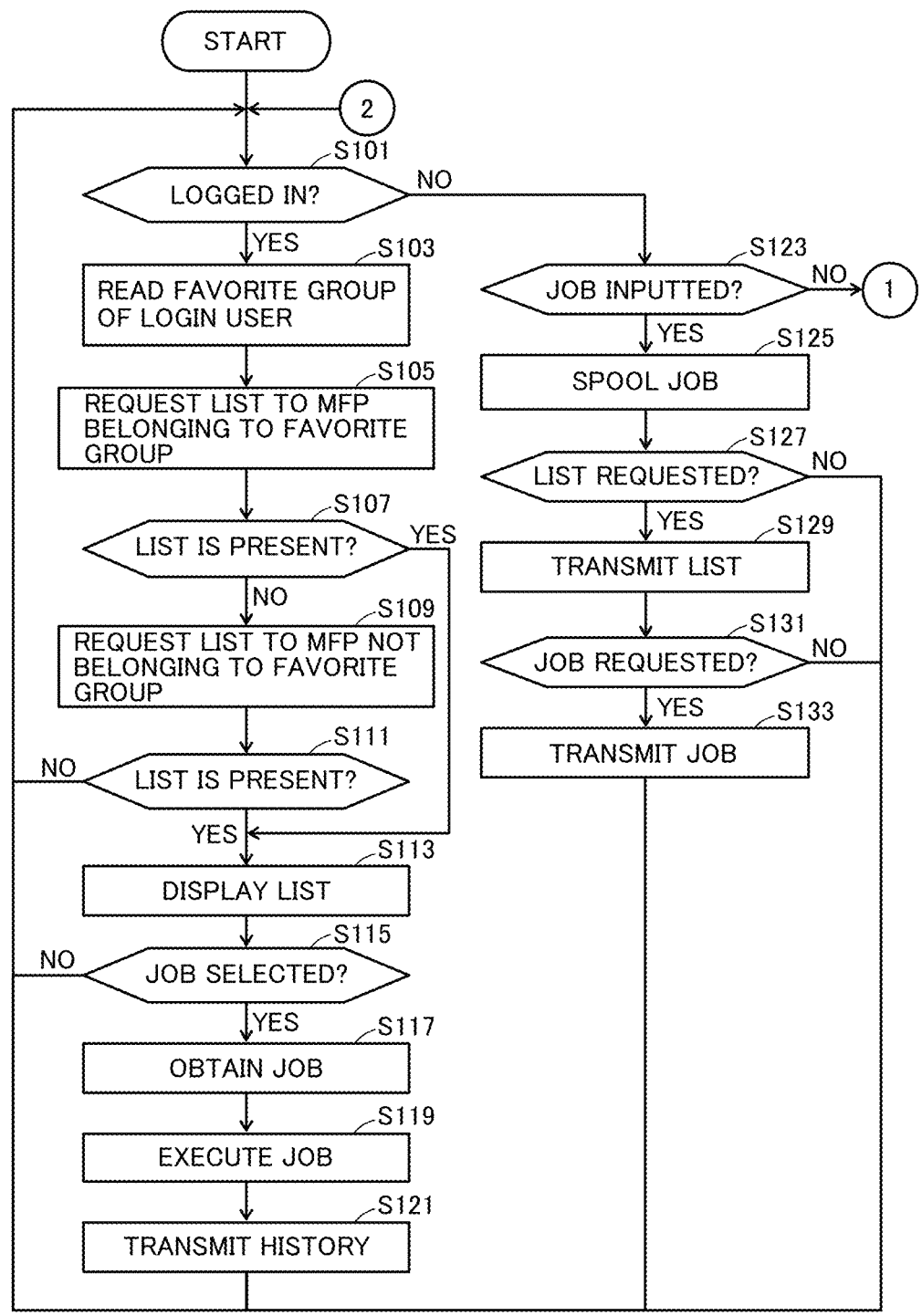
FIGS. 7 and 8 are flowcharts representing a specific example of a flow of operation in the MFP.
Figure 8:
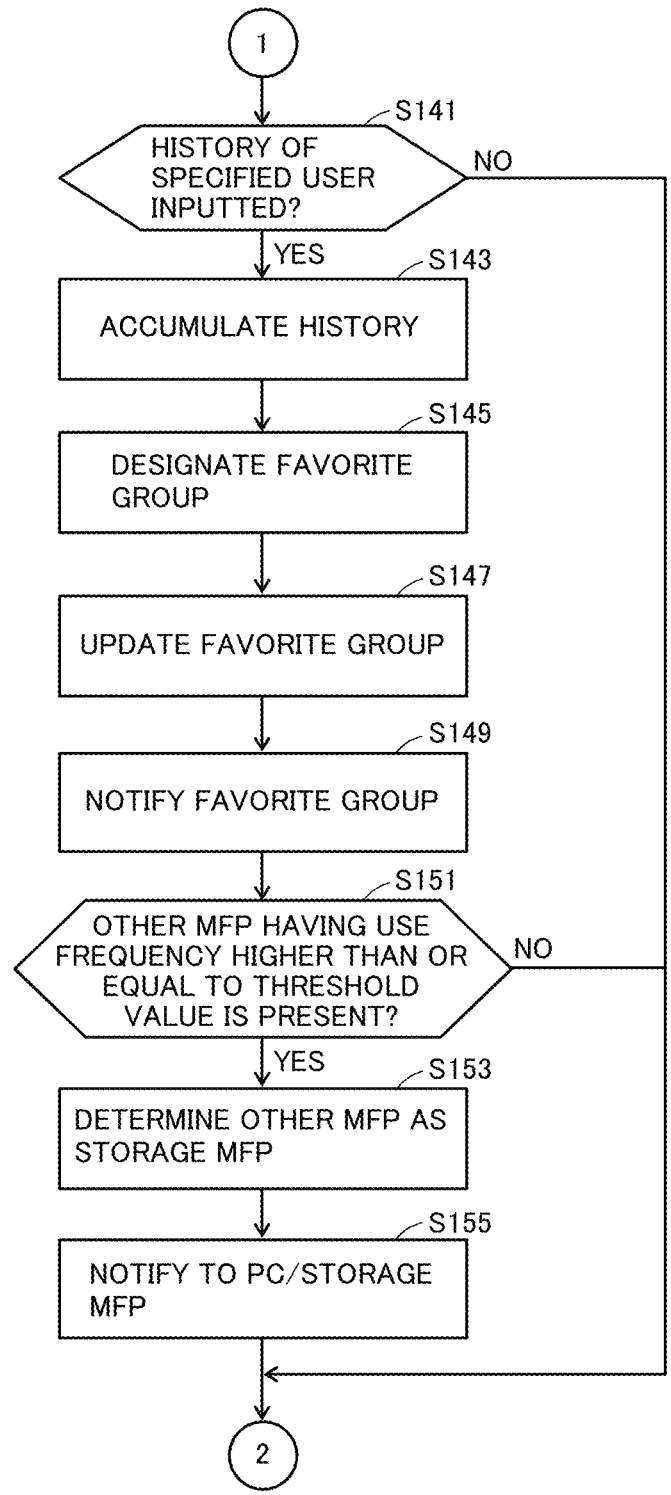

FIGS. 7 and 8 are flowcharts representing a specific example of a flow of operation of MFP 100. The operation represented in the flowcharts of FIGS. 7 and 8 is achieved in such a manner that CPU 10 of MFP 100 reads a program stored in ROM 11 onto RAM 12 and executes the same to exhibit each function of FIG. 6.

Referring to FIG. 7, when MFP 100 receives a log-in from a user (YES in Step S101), CPU 10 of MFP 100 reads a favorite group of the login user from a memory (Step S103). CPU 10 refers to the favorite group and specifies an MFP of being requested a list among one or more MFPs included in the present system.

CPU 10 requests a list to the relevant MFP (Step S105). Then, when the list is received from the relevant MFP (YES in Step S107), CPU 10 displays on operation panel 16 a list of jobs issued by the login user based on the received list (Step S113).

Preferably, when a list is not inputted from any MFP included in the favorite group (NO in Step S107), CPU 10 requests a list to other MFP included in the present system but not included in the favorite group (Step S109). Then, when a list is inputted in accordance with the request (YES in Step S111), CPU 10 displays on operation panel 16 a list of jobs issued by the login user based on the list (Step S113).

It should be noted that, when a list is not inputted from any MFP (NO in Step S107, and NO in Step S111), a job issued by the login user is not spooled in any MFP in the present system. Therefore, CPU 10 terminates the processing without performing the subsequent operation. In this case, preferably, CPU 10 notifies errors such as "no relevant job is available" on operation panel 16.

When a selection of a job to be executed among the list of jobs displayed on operation panel 16 is received (YES in Step S115), CPU 10 obtains the job from the MFP spooling the job (Step S117). Then, CPU 10 executes the selected job in accordance with an operation by a user (Step S119).

Preferably, CPU 10 transmits a history of the MFP of obtaining a list, a history of the MFP of obtaining a job, or a history of receiving a log-in of the login user as a use history of the login user to other MFP included in the present system (Step S121). The destination in step S121 may be, for example, an MFP included in the favorite group of the login user or may be all of MFPs included in the present system.

It should be noted that, in this example, the client MFP transmits a use history of the login user to other MFP. However, the use history is not limited to the example of being stored in the client MFP. For example, the storage MFP may store the access record from the client MFP as a use history of the login user.

On the other hand, when MFP 100 receives an input of a job from PC 200 (YES in Step S123), CPU 10 spools the job to the memory (Step S125). When a list of a user who is an issuer of the job spooled in the memory is requested from other MFP (YES in Step S127), CPU 10 transmits the requested list to other MFP (Step S129). Further, when a job is requested from other MFP (YES in Step S131), CPU 10 transmits the requested job to other MFP (Step S133).

When the job is transmitted to other MFP in the above-described Step S133, CPU 10 may delete the job from the memory. Alternatively, regardless of a presence of a transmission of a list and a presence of a transmission of a job, CPU 10 may delete the job from the memory after a predetermined period from the reception of the job or may follow the job provision as to the deletion of a job and a storing period.

Referring to FIG. 7, when MFP 100 receives from other MFP an input of a user history of a user defining the MFP as a storage MFP (YES in Step S141), CPU 10 stores the inputted use history (Step S143). Then, at a specified timing such as a timing of receiving a use history, CPU 10 updates a favorite group of the user.

In other words, CPU 10 refers to accumulated use histories of the user and designates, for example, MFPs of a predetermined numbers in the order of higher use frequency or MFPs having a use frequency higher than a threshold value as an MFP belonging to the favorite group of the user (Step S145). Then, CPU 10 updates the favorite group of the user already stored in the memory (Step S147). Next, CPU 10 notifies the updated favorite group to other MFP (Step S149). The destination of the notification in Step S149 may be respective one or more MFPs included in the updated favorite group. Further, the destination of the notification in Step S149 may be respective one or more MFPs included in the favorite group prior to the update but not included in the updated favorite group. In Step S149, CPU 10 may transmit the use history of the user in addition to the information which may specify respective one or more MFPs included in the updated favorite group.

Preferably, CPU 10 designates a new storage MFP of the user. The designation of the storage MFP may be executed at the same timing as the timing of updating the favorite group such as the timing of receiving the use history of the user, as represented in FIG. 8, or may be executed at a different timing.

In other words, CPU 10 refers to the accumulated use histories of the user and determines whether or not an MFP having a use frequency exceeding a predefined threshold value is present. Then, when the MFP having a use frequency higher than or equal to the threshold value is present (YES in Step S151), CPU 10 designates relevant one or more MFPs as new storage MFPs of the user (Step S153). Then, CPU 10 notifies PC 200 the MFP designated as the storage MFP (Step S155). Preferably, CPU 10 transmits to the MFP designated as the storage MFP the use history of the user stored in the memory. In such a manner, the MFP designated as the storage MFP can execute updating the favorite group and designating the next storage MFP with the user as a specified user.

The MFP included in the system according to the present embodiment performs the above-described operation, so that the destination to which the client MFP enquires a presence of spooling of a job issued by a login user with respect to the present system is dynamically designated based on a use history of the user. Therefore, the client MFP can perform the above-described enquiry preferentially to the MFP having a high possibility of spooling the job issued by the user. Therefore, even when the number of MFPs included in the system becomes greater, the client MFP can obtain a job of a login user efficiently while suppressing an increase in a traffic. Accordingly, the processing at the client MFP can be accelerated.

Moreover, the client MFP can display jobs having a high possibility of being selected by a login user as a list. Therefore, the efficiency of the user's operation can be improved.

It should be noted that, other than the favorite group described above, a group (nearby group) of one or more MFPs set by a specified user such as a manager may be defined for each user. The nearby group is a group including one or more MFPs having the arrangement of MFPs within a predetermined area. A manager or the like sets in advance for each user a nearby group as MFPs allowing the user for use.

MFP 100 stores a nearby group associated with a user. Then, MFP 100 designates a favorite group or a new storage MFP from among one or more MFPs included in the nearby group.

In the description above, according to the present system, one group of MFPs to which the client MFP preferentially enquires a presence of a job issued by a login user is created as a favorite group of the user. However, the favorite group associated with a user is not limited to one. A plurality of groups may be constructed in accordance with a priority. In other words, according to the present system, two or more groups including a first group, a second group, and so on may be created in the order of priority for each user dynamically based on the use history of the user. In this case, the client MFP firstly enquires respective one or more MFPs included in the first group of the login user a presence of spooling of a job issued by the user. Then, in the case where a list could not be obtained, in the case where the number of spooled job did not reach the predefined number, or in the case where a user has not selected from those, the client MFP enquires respective one or more MFPs included in the second group a presence of spooling of the job issued by the user. In other words, the client MFP enquires a presence of a job issued by the user in a step-like manner in accordance with a priority.

Also in such a manner, the client MFP can obtain a job efficiently while suppressing an increase in a traffic.

In the description above, the present system does not include a server. In other words, it is premised that the present system is a so-called serverless system. Therefore, any of the MFPs (for example, a storage MFP) update a favorite group of a user or designates a new storage MIP. However, the MFP executing the above-described processing is not limited to the storage MFP. For example, any of the MFPs may have a management function so that the MFP may centrally update favorite groups of all of users or designate a new storage MFP moreover, the present system may include a server for managing a favorite group and a storage MFP, and the server may execute the above-described processing.

The disclosed features are achieved by one or more modules. For example, the features can be achieved by a circuit element and other hardware module, by a software module defining a processing achieving the features, or by a combination of the hardware module and software module.

A program as a combination of one or more software modules for allowing a CPU of an MFP to execute the above-described operation can also be provided. By providing such a program, the above-described operation can be executed by an existing MFP. Therefore, the above-described system can be readily constructed with use of an existing MFP.

Such a program can be recorded in computer-readable recording media such as a flexible disk, a CD-ROM (Compact Disk-Read Only Memory), a ROM, a RAM, and a memory card attached to a computer and provided as a program product. Alternatively, the program can be provided by recording it on a recording medium such as a hard disk provided in a computer. Moreover, the program can be provided by downloading it through a network.

It should be noted that the program according to the present disclosure may be the one calling a necessary module from program modules provided as a part of an operating system (OS) of a computer at a predetermined sequence and at a predetermined timing and allowing the processing to be executed. In that case, the program itself does not include the above-described module, and the processing is executed in cooperation with the OS. Such a program including no module is also included in the program according to the present disclosure.

Moreover, the program according to the present disclosure may be incorporated into a part of other program and provided. Also in that case, the program itself does not include a module included in the above-described other program, and the processing is executed in cooperation with other program. Such a program incorporated into other program is also included in the program according to the present disclosure.

The provided program product is installed in a program storage unit such as a hard disk and then executed. It should be noted that the program product includes a program itself and a recording medium storing the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A management apparatus used in an image forming system to which a plurality of image forming apparatuses are connected, comprising:
   a receiver that receives a use history of a user from at least one image forming apparatus among said plurality of image forming apparatuses; and
   a processor that designates at least two favorite groups, each favorite group comprising one or more image forming apparatuses among said plurality of image forming apparatuses as a group of image forming apparatuses having a higher priority than another image forming apparatus of the plurality of image forming apparatuses, based on said use history of said user, and stores information related to the at least two favorite groups to a storage device,
   wherein said processor, in response to a failure to identify a presence of a job in those image forming apparatuses of the first favorite group, identifies a second favorite group of the at least two favorite groups based on the use history of the user, and sends a request only to those image forming apparatuses of the second favorite group for information related to at least one job associated with said user, based on said information related to said second favorite group stored in said storage device, prior to the execution of the at least one job,
   wherein said processor receives said information related to at least one job associated with said user from the image forming apparatuses of the second favorite group to which the processor sends the request, obtains a job designated by the user from the image forming apparatus that spools the job, and executes the job.

2. The management apparatus according to claim 1, wherein
   said use history includes a history of requesting information related to said job.

3. The management apparatus according to claim 1, wherein
   said processor designates one or more image forming apparatuses belonging to said first favorite group in an order of image forming apparatuses having a higher use frequency of said user based on said use history.

4. The management apparatus according to claim 3, wherein
   said processor designates image forming apparatuses of a predefined number as image forming apparatuses belonging to said first favorite group in such a manner that a communication speed for obtaining information related to said job does not become less than a predefined speed.

5. The management apparatus according to claim 1, wherein
said processor designates one or more image forming apparatuses belonging to said first favorite group based on a use history within a predetermined period.

6. The management apparatus according to claim 1, further comprising:
a first transmitter that transmits to respective one or more image forming apparatuses belonging to said first favorite group designated by said processer information related respectively to one or more image forming apparatuses belonging to said first favorite group.

7. The management apparatus according to claim 1, wherein
said processor further designates one or more image forming apparatuses spooling a job issued by said user based on said use history received by said receiver, and
said management apparatus further comprises a second transmitter that transmits information respectively related to said one or more image forming apparatuses designated as image forming apparatuses spooling a job issued by said user to a device issuing a job of said user.

8. An image forming apparatus provided with said management apparatus according to claim 1.

9. The image forming apparatus according to claim 8, wherein
said processor requests information related to a job issued by a user to said plurality of image forming apparatuses,
said processor obtains a selected job among jobs corresponding to information related to the job obtained based on said request from an image forming apparatus spooling said job and execute the job, and
said processor further requests information related to said job to an image forming apparatus belonging to said first favorite group more preferentially than an image forming apparatus not belonging to said first favorite group.

10. The image forming apparatus according to claim 9, wherein
said processor requests information related to a job issued by a user logged in to said image forming apparatus provided with said management apparatus.

11. A non-transitory computer-readable storage medium storing a program causing a computer, which is included in an image forming system having a plurality of image forming apparatuses being connected and serves as a management apparatus, to perform a processing of managing a group including one or more image forming apparatuses, said program causing said computer to perform:
(a) receiving a use history of a user from at least one image forming apparatus among said plurality of image forming apparatuses;
(b) designating at least two favorite groups, each favorite group comprising one or more image forming apparatuses among said plurality of image forming apparatuses as a group of image forming apparatuses having a higher priority than another image forming apparatus of the plurality of image forming apparatuses, based on said use history of said user;
(c) storing information related to the at least two favorite groups wherein said information is associated with the user (d) in response to an action by said user, identifying a first favorite group of the at least two favorite groups based on the use history of the user and sending a request to only those image forming apparatuses of the first favorite group, for requesting information related to at least one job associated with said user, based on, information related to said first favorite group stored in said storage device, prior to execution of the at least one job;
(e) in response to a failure to identify a presence of a job in those image forming apparatuses of the first favorite group, identifying a second favorite group of the at least two favorite groups based on the use history of the user, and sending a request only to those image forming apparatuses of the second favorite group for information related to at least one job associated with said user, based on said information related to said second favorite group stored in said storage device prior to the execution of the at least one job;
(f) receiving said information related to at least one job associated with said user from the image forming apparatuses of the second favorite group to which the processor sends the request;
(g) obtaining a job designated by the user from the image forming apparatus that spools the job; and
(h) executing the job.

12. The non-transitory computer-readable storage medium according to claim 11, wherein
said use history includes a history of requesting information related to said job.

13. The non-transitory computer-readable storage medium according to claim 11, wherein
said step (b) includes designating one or more image forming apparatuses belonging to said first favorite group in the order of image forming apparatuses having a higher use frequency of said user based on said use history.

14. The non-transitory computer-readable storage medium according to claim 13, wherein
said step (b) includes designating a predefined number of image forming apparatuses as image forming apparatuses belonging to said first favorite group in such a manner that a communication speed for obtaining information related to said job does not become lower than a predefined speed.

15. The non-transitory computer-readable storage medium according to claim 11, wherein
said step (b) includes designating one or more image forming apparatuses belonging to said first favorite group based on a use history within a predetermined period.

16. The non-transitory computer-readable storage medium according to claim 11, wherein said program further causes said computer to perform:
(i) transmitting, with respect to respective one or more image forming apparatuses belonging to the said first favorite group designated in said step (b), information related respectively to one or more image forming apparatuses belonging to said first favorite group.

17. The non-transitory computer-readable storage medium according to claim 11, wherein said program further causes said computer to perform:
(j) based on said use history received in said step (b), designating one or more image forming apparatuses spooling a job issued by said user, and
(k) transmitting information related to said one or more image forming apparatuses designated as image forming apparatuses spooling a job issued by said user to a device issuing a job of said user.

18. The non-transitory computer-readable storage medium according to claim 11, wherein said program further causes said computer to perform:
(l) updating information related to said at least two favorite groups having different priorities of requesting information related to said job based on said use history of user received in said step (a).

19. The non-transitory computer-readable storage medium according to claim 11, wherein
a computer serving as said management apparatus is provided in at least one image forming apparatus among said plurality of image forming apparatuses.

20. The non-transitory computer-readable storage medium according to claim 19, wherein said program further causes said computer to perform:
(m) requesting information related to a job issued by a user to said plurality of image forming apparatus; and
(n) obtaining a job selected from one or more jobs corresponding to information related to a job obtained based on said request in step (m) from an image forming apparatus spooling the job, and executing the job, wherein
said step (m) includes requesting information related to said job to an image forming apparatus belonging to said first favorite group more preferentially than an image forming apparatus not belonging to said first favorite group.

21. The non-transitory computer-readable storage medium according to claim 20, wherein
said step (m) includes requesting information related to a job issued by a user logged in to said management apparatus which is an image forming apparatus.

22. The management apparatus according to claim 1, wherein said storage device is comprised of one of said plurality of image forming apparatuses.

23. The non-transitory computer-readable storage medium according to claim 11, wherein said storage device is comprised of one of said plurality of image forming apparatuses.

24. A management apparatus used in an image forming system to which a plurality of image forming apparatuses are connected, comprising:
a receiver that receives a use history of a user from at least one image forming apparatus among said plurality of image forming apparatuses; and
a processor that causes a storage device to store information related to at least two favorite groups, each favorite group comprising a subset of said plurality of image forming apparatuses, in association with a user, wherein the subset of the image forming apparatuses is one or more image forming apparatus designated as having a higher priority than another image forming apparatus of the plurality of image forming apparatuses, based on said use history
wherein said processor, in response to an action by a user, identifies a first favorite group of the at least two favorite groups based on the use history of the user and sends a request to only those image forming apparatuses of the first favorite group, for information related to at least one job associated with said user, based on said information related to said first favorite group stored in said storage device, prior to execution of the at least one job;
wherein said processor, in response to a failure to identify a presence of a job in those image forming apparatuses of the first favorite group, identifies a second favorite group of the at least two favorite groups based on the use history of the user, and sends a request only to those image forming apparatuses of the second favorite group for information related to at least one job associated with said user, based on said information related to said second favorite group stored in said storage device, prior to the execution of the at least one job; and
wherein said processor receives said information related to at least one job associated with said user from the image forming apparatuses of the second favorite group to which the processor sends the request, obtains a job designated by the user from the image forming apparatus that spools the job, and executes the job.

25. A non-transitory computer-readable storage medium storing a program causing a computer, which is included in an image forming system having a plurality of image forming apparatuses being connected and serves as a management apparatus, to perform a processing of managing a group including one or more image forming apparatuses, said program causing said computer to perform steps of:
(a) receiving a use history of a user from at least one image forming apparatus among said plurality of image forming apparatuses; and
(b) causing a storage device to store information related to at least two favorite groups, each favorite group comprising a subset of said plurality of image forming apparatuses, in association with a user, wherein each subset of the image forming apparatuses is one or more image forming apparatus designated as having a higher priority than another image forming apparatus of the plurality of image forming apparatuses for requesting information related to a job associated with said user, based on said use history of, wherein
said step (b) includes updating, by using information related to an image forming apparatus designated as having a higher priority than another image forming apparatus for requesting information related to at least one job associated with said user based on said use history, information related to said at least two favorite groups stored in said storage device, and
(c) in response to an action by said user, identifying a first favorite group of the at least two favorite groups based on the use history of the user and sending a request to only those image forming apparatuses of the first favorite group, for information related to at least one job associated with said user, based on said information related to said first favorite group stored in said storage device, prior to execution of the at least one job;
(d) in response to a failure to identify a presence of a job in those image forming apparatuses of the first favorite group, identifying a second favorite group of the at least two favorite groups based on the use history of the user, and sending a request only to those image forming apparatuses of the second favorite group for information related to at least one job associated with said user, based on said information related to said second favorite group stored in said storage device prior to the execution of the at least one job;
(e) receiving said information related to at least one job associated with said user from the image forming apparatuses of the second favorite group to which the processor sends the request;
(f) obtaining a job designated by the user from the image forming apparatus that spools the job; and
(g) executing the job.

26. A method performed in a management apparatus used in an image forming system to which a plurality of image forming apparatuses are connected, comprising:
  (a) receiving a use history of a user from at least one image forming apparatus among said plurality of image forming apparatuses,
  (b) causing a storage device to store information related to at least two favorite groups, each favorite group comprising a subset of said plurality of image forming apparatuses, in association with a user, wherein each subset of the image forming apparatuses is one or more image forming apparatus designated as having a higher priority than another image forming apparatus of the plurality of image forming apparatuses, based on said use history of said user,
  wherein said step (b) includes updating, by using information related to an image forming apparatus designated as having a higher priority than another image forming apparatus of requesting information related to at least one job associated with said user based on said use history, information related to said at least two favorite groups stored in said storage device, and
  (c) in response to an action by said user, identifying a first favorite group of the at least two favorite groups based on the use history of the user and sending a request to only those image forming apparatuses of the first favorite group, for information related to at least one job associated with said user, based on said information related to said first favorite group stored in said storage device, prior to execution of the at least one job;
  (d) in response to a failure to identify a presence of a job in those image forming apparatuses of the first favorite group, identifying a second favorite group of the at least two favorite groups based on the use history of the user, and sending a request only to those image forming apparatuses of the second favorite group for information related to at least one job associated with said user, based on said information related to said second favorite group stored in said storage device prior to the execution of the at least one job;
  (e) receiving said information related to at least one job associated with said user from the image forming apparatuses to which the processor sends the request;
  (f) obtaining a job designated by the user from the image forming apparatus that spools the job; and
  (g) executing the job.

* * * * *